Patented Nov. 18, 1924.

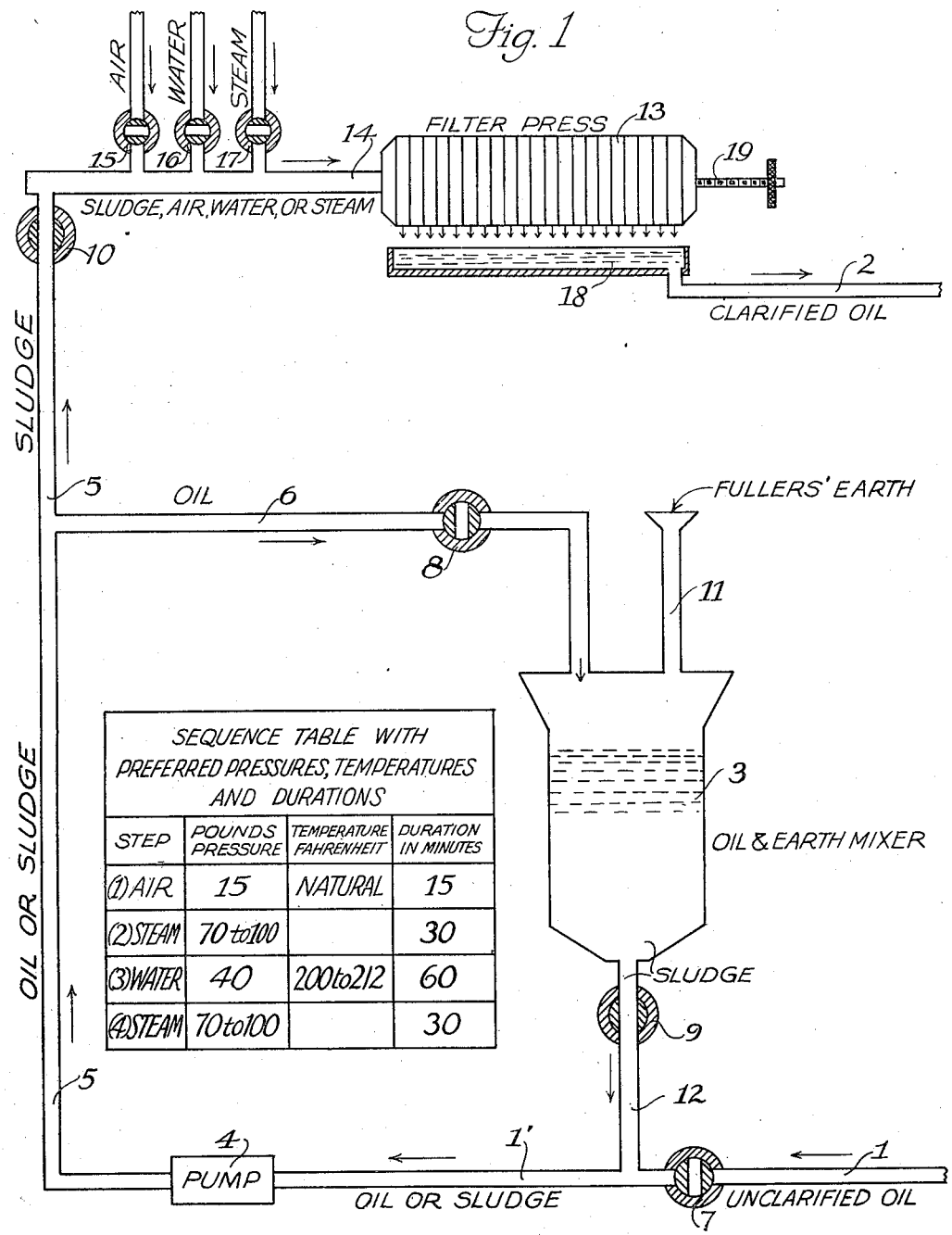

1,515,597

UNITED STATES PATENT OFFICE.

PETER P. HINDELANG, OF SAN ANTONIO, TEXAS, ASSIGNOR, BY MESNE ASSIGNMENTS, TO STANDARD FULLERS EARTH CO., INC., OF SAN ANTONIO, TEXAS, A CORPORATION.

PROCESS FOR CLARIFYING OIL.

Application filed October 17, 1922. Serial No. 595,165.

*To all whom it may concern:*

Be it known that I, PETER PAUL HINDELANG, a citizen of the United States of America, and a resident of San Antonio, county of Bexar, and State of Texas, have invented a new and useful Improvement in Processes for Clarifying Oil, of which the following is a specification.

This invention relates to processes adapted for clarifying oil and more particularly to filtration and to methods for recovering the residue of oil contained in the earth on the filter member after a batch or charge of sludge composed of oil and fuller's earth has been filtered, and is especially an improvement over the process described and claimed in the Munro Patent No. 1,284,750, issued on November 12, 1918.

The main objects of this invention are to lessen the waste of oil in spent press cake; and especially to recover a greater part of the oil from used fuller's earth; and to provide an improved sequence of desirably effective steps suitably characterized as to temperature, pressure and duration.

It has long been customary to clarify oils by treating in liquid form with fuller's earth or the like and filtering. The sludge is prepared and filtered in batches and the used earth or clay is removed periodically between batches, and disposed of as waste. When a batch of sludge is run through a filter the earth and all coloring matter and other impurities collected thereby are retained on the filter member in the form of hard mud or "cake", which has to be disposed of. This cake is normally somewhat thick and tenacious, and contains a substantial proportion of oil, which unless recovered from the cake is wasted. A large part of this "cake oil" may be removed by the successive use of air, water and steam as set forth in said Munro patent. The cake, however, is of extremely fine consistency and in the press becomes set very compactly, and as a result the capillary attraction for the residual oil is very great. Hence a considerable part of the oil is left in the cake at the conclusion of the commercial processes heretofore used. With the extensive modern development of this branch of oil refining, especially with respect to edible oils, even the very small average percentage of waste in the cake occurring with present methods represents a large aggregate waste in a short time.

Applicant has discovered that by following a certain specific new sequence of steps, herein after set forth, a very positive increase in the percentage of oil commercially recoverable from the filter cake may be effected. He has found that the three step air-water-steam process of the Munro patent is greatly improved by inserting a steam step immediately after the initial air step, thus providing his more efficient four step air-steam-water-steam process.

The duration of the several steps and certain other data are shown by the tabulation appearing with the drawing, substantially as follows:

*Sequence table with preferred pressures, temperatures, and durations.*

| Step. | Pounds pressure per sq. in. | Temperature Fahrenheit. | Duration in minutes. |
|---|---|---|---|
| (1) Air | 15 | Natural | 15 |
| (2) Steam | 70 to 100 |  | 30 |
| (3) Water | 40 | 200 to 212 | 60 |
| (4) Steam | 70 to 100 |  | 30 |

The normal pressure is about forty pounds per square inch.

Tests conducted to determine the merits of this process showed that the said four step method eliminated about fifteen to twenty-five per cent of the cake oil waste incident to the said Munro three step process.

An illustrative embodiment of means for carrying out this invention is shown in the accompanying drawing, comprising a conventional diagram showing the pipe and valve connections for the pump, mixer, filter, and receiving trough, the valves being set in the filtering position.

In the embodiment shown in the drawings, the unclarified oil is supplied from any suitable source (not shown) through the inlet pipe 1 and the clarified oil is discharged through the pipe 2 leading to any suitable receptacle (not shown). Three main steps are carried out in the process as follows:

First, a batch of sludge is prepared, for which purpose the mixing tank 3 is filled by pumping unclarified oil from its source, by means of pump 4 in the direction shown by the arrows, through the pipes 1, 1', 5 and 6, the valves 7 and 8 being open (though shown closed in the drawing). The valve 9 at the lower end of tank 3 is closed at this time, and preferably also valve 10. A suitable proportion, about three per cent by weight, of fuller's earth is introduced as at 11 and mixed with the oil in the tank 3.

Second, the mixture of oil and earth or sludge is then pumped into the filter press 13 through the pipes 12, 1', 5, and 14, the valves 9 and 10 being open, and the valves 7, 8, 15, 16 and 17 being closed. The oil becomes clarified by contact with the fuller's earth, which takes up all coloring matter and other minute impurities such as could not otherwise be removed by filtration, and the earth containing the impurities is separated from the oil in the filter press, the earth being collected on suitable filters (not shown) such for instance as canvas or the like, as usual in such processes, and the clarified oil drains off and collects in a receiving trough 18, from which it is discharged through the pipe 2.

Third, after the charge of oil and earth has all been pumped from the mixer 3 into the filter press and the clarified oil has passed on, leaving the earth and impurities in the filter, there is still some oil retained in the press, being held by capillarity in the pores of the cake. This residual oil is removed by admitting successively air, steam, water, and steam by means of the valves 15, 16, and 17, which communicate with suitable sources under requisite pressure.

After the oil and earth separation process is completed, the press is opened by releasing the screw member 19, as usual in devices of this character. The filters, bearing their solid deposits of earth and impurities, are then exposed, and the earth or cake is friable and readily crumbles and falls away and may be collected in a suitable waste receptacle (not shown) as understood in the art.

Although but one specific embodiment of means has been herein shown and described, it will be understood that some of the details of the apparatus described may be altered or omitted without departing from the spirit of this invention as defined by the following claims.

I claim:

1. The method of separating oil from fuller's earth impregnated with oil which consists in forcing air, steam, water, and steam therethrough successively in the order enumerated.

2. The process of removing oil from fuller's earth filter press cake impregnated with oil which consists in (1) forcing air therethrough for about fifteen minutes under about fifteen pounds pressure per square inch at natural temperature, (2) forcing steam therethrough for about thirty minutes at about 70 to one hundred pounds pressure per square inch, (3) forcing water therethrough for about sixty minutes under about forty pounds pressure per square inch, and at about two hundred to two hundred and twelve degrees Fahrenheit, and finally (4) again forcing steam therethrough for about thirty minutes at about 70 to one hundred pounds pressure per square inch.

Signed at Chicago this 11th day of October, 1922.

PETER P. HINDELANG.